Aug. 6, 1957  G. M. ALLDER  2,802,148
AUTOMOBILE SEAT COVER HAVING ELECTRICAL GROUNDING
PROPERTIES AND GROUNDING TAPE
Filed April 17, 1953

INVENTOR.
George Morris Allder
BY
ATTORNEY.

United States Patent Office 2,802,148
Patented Aug. 6, 1957

2,802,148

AUTOMOBILE SEAT COVER HAVING ELECTRICAL GROUNDING PROPERTIES AND GROUNDING TAPE

George Morris Allder, Oklahoma City, Okla., assignor to Waldo E. Nutter, Kirkwood, Mo.

Application April 17, 1953, Serial No. 349,505

4 Claims. (Cl. 317—2)

This invention has to do with the field of static or frictional electricity, and has for its primary object the provision of structure for solving harassing problems created by the development of this type of electromotive force, particularly as it relates to irritation, painful reactions and frightening results by those who are subjected thereto.

The electricity of stationary charges produced by rubbing unlike bodies together is well known, for few have failed to experience the startling effect of sudden, disruptive discharges of such electrical forces when approaching or touching objects having a different potential. Such equalization of the differences in electrical potentials is especially aggravating when one touches metallic parts of automobiles, and while many attempts have been proposed to obviate the difficulty, no satisfactory solution has heretofore been developed.

Static electricity appears to be more prevalent in cold weather, probably because of the humidity factor. In moist air, bodies discharge rapidly and the accumulation of charges upon their surfaces is less noticeable. Thus, in cold weather, when perspiration is at a minimum, and the absolute humidity much less than in warm weather, complaints of "shocks," as the electrified body discharges its surface charge, are quite frequent.

Automobile seat covers seem to present one of the greatest problems in this regard, more especially in recent years, as the result of development of new materials, such as the synthetics, including nylon and plastics. The frictional contact between the clothing of automobile passengers and such covers quickly produces a difference of potential between the passengers and the remainder of the automobile. As the statically charged passenger approaches another body of different potential, such as the metal body of the automobile, the potential gradient or electrical pressure increases until ionization takes place, producing an undesirable sensation of shock.

It is recognized that devices have been provided, with varying degrees of success, to "ground" the automobile itself in order to lessen the shock as one approaches the body thereof and grasps a door handle or contacts other metallic parts of the vehicle while standing on the ground. This discharging of static electricity from the electrified automobile is to be distinguished, however, from the aforementioned seat and seat cover problems concerning charges within the automobile body, for none of such devices has been effective in elimination of the development of a difference in potential between the automobile and the occupant as he slides across the seat or its cover.

It is the most important object of the present invention therefore, to provide structure for eliminating static electricity shock to individuals, which structure is particularly adaptable for use in automobiles and capable of equalizing the charge simultaneously as it is produced, or immediately thereafter, with no noticeable effect on the passengers, and for the most part, notwithstanding the nature of the materials forming their clothing or the surface upon which they are seated.

An essential object of this invention is to provide means to eliminate static electricity shock wherein the means is in the nature of a flat grounding tape so formed as to equalize the difference in potential between an individual and an automobile for example, simultaneously with or immediately after the charges are developed, whereby there will be no discharge when such individual touches a metallic part of the automobile.

Another important object of this invention is to provide a grounding strip made up in part at least of conductive material and including a plurality of terminal ends throughout the length thereof so that the grounding strip discharges itself immediately and discharges any body in close proximity thereto, all to the end that when the device is attached flatly to a seat cover for instance, automobile passengers will at all times be protected against shock due to static electricity.

Other objects include the way in which the grounding tape is made so as to present the large number of terminal ends aforementioned; the manner of interconnecting the conductive members making up the grounding element; the way in which the conductive element is mounted flatly on a supporting strip or tape; the way in which the tape is rendered adaptable for mounting on flat surfaces such as seat covers; and many more minor objects, all of which will be made clear as the following specification progresses.

It is generally agreed that the character of the discharge of static electricity, or the equalization of a difference in electrical potential between two points, is determined primarily by the nature of the medium through which the discharge takes place, the amount of such difference in potential, and the form of the terminal conductors on which the difference exists. The spark that is produced across the air gap between the tips of the fingers and the ignition key for instance, through which the discharge passes, can oftentimes be seen and heard, as well as felt, and is evidence of the relatively high potential that has developed between these two terminals as the result of the sliding, frictional engagement by wearing apparel with the seat or seat cover.

When two differently charged, smooth surface bodies are brought into proximity in air, the voltage gradient, and therefore, the field intensity, increase as the distance diminishes. At a predetermined distance of separation between these bodies the field intensity is sufficiently strong to rupture the air dielectric, causing the air to ionize, thereby becoming a good conductor and allowing a current to flow between the bodies until their potential difference approaches zero.

If the surface area of one of the charged bodies is pointed, the field intensity required to produce ionization occurs at a greater distance of separation between the bodies than the predetermined distance above mentioned. If the predetermined separation distance is kept the same, then ionization can be made to occur at a much lower difference in potential between the two bodies, since making the surface of one body sharply pointed, greatly increases the field intensity in the air between the two bodies. By the use of many sharply pointed tips on one body, the field intensity required to produce ionization of air occurs at a much lower difference in potential between the two bodies.

The magnitude of the discharge current between the two bodies through the ionized air is sufficiently reduced by the use of many sharply pointed tips on one body that the sensation to a human being is reduced to a negligible quantity. The important aspect of this principle is that discharge occurs at a reduced potential when sharp tips are used for the surface of one body, as compared to both bodies having smooth surfaces.

The failure to recognize these basic principles is the primary reason for failure in devices heretofore proposed to eliminate static electricity shock, and as will hereinafter appear, the present invention is novel, successful and of extreme value because it follows such laws of dielectric flux and ionization.

Figure 2:
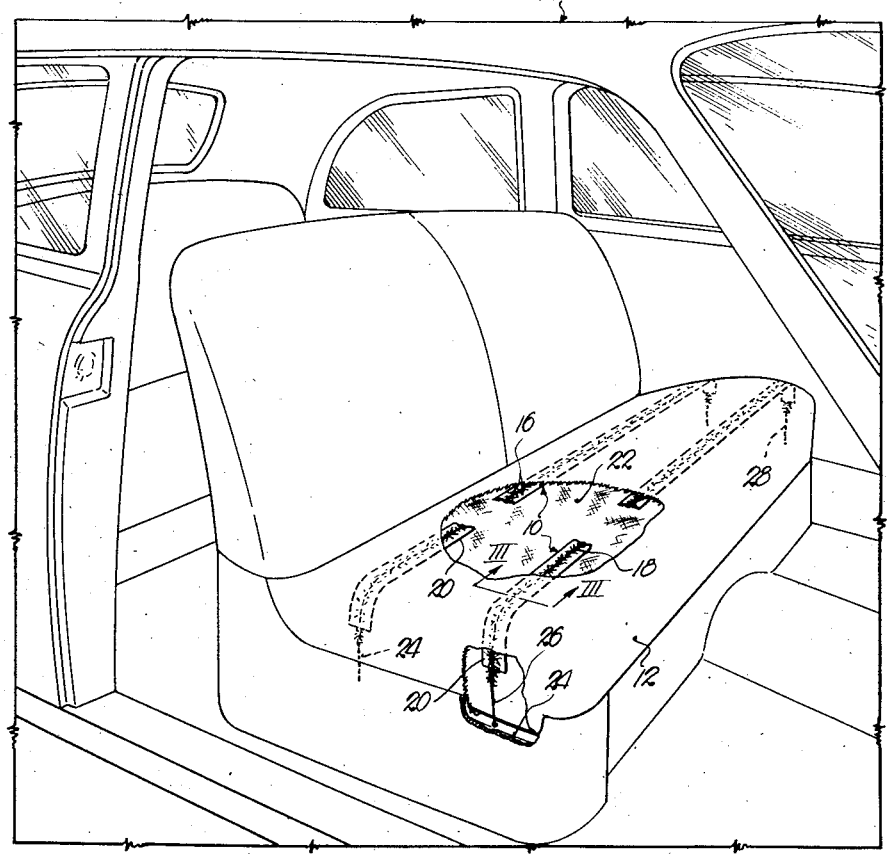
Fig. 2 is a perspective view showing the interior of an automobile provided with a seat cover having electrical grounding properties by virtue of the use of the grounding tape hereof, the seat cover and the tapes being partially broken away for clearness.
Figure 3:
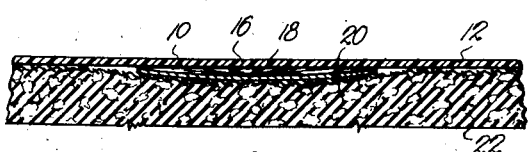
Fig. 3 is an enlarged, fragmentary, transverse, cross-sectional view taken on line III—III of Fig. 2.

One of the primary uses for grounding tape 10, forming the subject matter of the present invention, is illustrated in Figs. 2 and 3 of the drawing since, as above set forth, static electricity shock is most prevalent in automobiles, particularly because of the use of synthetics in making seat covers 12 for automobiles, herein designated broadly by the numeral 14.

It will hereafter become apparent, however, that the tape 10 may well have many other uses, and the illustration of its adaptation to seat covers 12 is to be understood as representative only of such adaptations. Furthermore, tape 10 itself may be made in a number of ways, but the device chosen for illustration is made up of a mass of relatively thin members 16 in the nature of filaments, fibers or thread-like tentacles. The filaments 16 chosen for illustration are preferably highly conductive, and one way in which this may be accomplished is through utilization of a plurality of metallic shavings or long, thin bristle-like conducting members 16, as illustrated. The cross-sectional configurations of the filaments 16 are of no importance but the lengths thereof should be chosen and be sufficiently elongated to provide the desired and needed electrical pressure or necessary gradient.

No particular arrangement of the plurality of members 16 throughout the length of the strip 10 is needed other than that they lie flatly thereon and in fact, it is to be preferred that the same assume the disheveled or disorderly arrangement illustrated in the drawings. Because of such disarray of the members 16, they are for the most part all in interconnected relationship since virtually every individual member 16 contacts one or more of the adjacent members 16. The primary factor, however, lies in the presentation of a terminal end in each member 16 respectively that performs the function of quickly discharging any body proximal thereto, rendering the tape 10 itself incapable of retaining a static electrical charge thereon for any appreciable length of time.

In the embodiment of tape 10 chosen for illustration, the metallic filaments 16 are mounted upon a longitudinally extending core 18 that may consist of any suitable substance such as a fabric thread or cord. The core 18, together with the filaments 16 secured thereto and extending laterally therefrom in but two opposite directions throughout the length of core 18, are mounted upon an elongated strip 20, and here again, the manner of securing the same to one face of tape 20 may be varied according to the desires of the manufacturer. It is proposed that a suitable adhesive be used for bonding the core 18 and/or the filaments 16 to the tape 20.

A pair of tapes 10 are shown in Fig. 2 of the drawing interposed between seat 22 of automobile 14 and the cover 12. These two tapes 10 are also illustrated in Fig. 2 as connected to a metallic part 24 of the body of automobile 14 at both ends of the tape 10 through the medium of suitable conductors 26 and 28 interconnecting the filaments 16 and the metal part 24.

As illustrated in Figs. 2 and 3, it is to be preferred that the filaments 16 directly engage the innermost face of the cover 12, and it may well be desirable to actually affix the tapes 10 to seat cover 12 to hold the tapes 10 in place and to assure an intimate contact between the filaments 16 and the seat cover 12. The means of attachment that is preferred is to bond the strip 20 directly to the seat cover 12 by use of an adhesive.

It can immediately be seen that the two conductors 26 and 28 aid in holding the tapes 10 in place, but so far as grounding purposes are concerned, only one conductor is needed to interconnect the members 16 and the frame part 24. Furthermore, if desired, the core 18 may be rendered conductive or made from a conductive material such as metal, thereby establishing a direct coupling between the members 16 and the frame part 24.

Many means other than that herein specifically described may be used to present a device having a plurality of terminal ends, such as the provision of a painted or printed circuit superimposed directly upon tape 20 or other support. If individual members 16 are utilized however, the same need not be made of metal or other conductive material, but may be rendered conductive through a suitable coating of metallic material or the like.

The utilization of the strip 20 is not absolutely essential, but if it is used, adhesive may be eliminated and the members 16 secured thereto by stapling or sewing the core 18 to the strip 20. Stitching provides also a satisfactory way of securing the tape 20 to the seat cover 12. Masking tape, "Scotch" tape, fabrics, heavy paper or fibrous material, or any other, preferably flexible, substance may be used in the strip 20 and the same results emanating from the present invention can be produced without appreciable expense.

Two tapes 10 are shown in Fig. 2 of the drawing to assure that an occupant in the automobile 14 on the seat 22 will rest directly upon at least one of the tapes and thereby gain the advantages contemplated by the present invention. Tapes 10 may be mounted in place as shown in Fig. 2 of the drawing prior to placing the cover 12 over the cushion 22, or the tapes 10 may be mounted on the innermost face of the cover 12 with the members 16 engaging the same prior to installation of the cover 12 within the automobile 14.

It is further contemplated that bolts of material from which seat covers 12 are to be made, might well be provided with the tapes 10 secured thereto in spaced relationship throughout the length thereof, whereupon, when the seat cover 12 is cut out, it will have electrical grounding properties and be ready for installation as desired. Additionally, the element 16—18 may be laid upon a conventional seat cushion and a seat cover assembled thereover, presenting therefore, an accessory which may be merchandised for various uses. If, on the other hand, the seat itself is initially upholstered with plastic or other material which causes static electricity shock as hereinabove described, then the preventative device hereof may be interposed between the padding of the seat and such upholstery.

Figure 1:
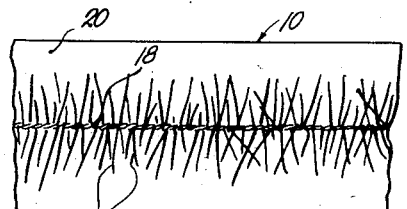
Figure 1 is a fragmentary, plan view of a grounding tape made pursuant to the present invention.
Figure 4:
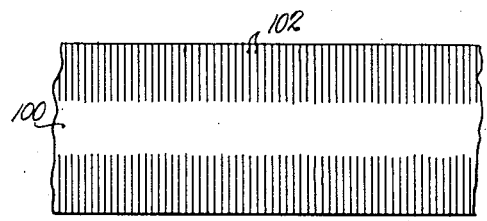
Fig. 4 is a fragmentary, plan view of a modified form of tape.

An elongated, flat strip 100 made of metallic or other conductive material, or coated to render the same conductive, may have one or both of its two longitudinal, marginal edges slit, shredded or scalloped, presenting a series of tooth-like fingers 102 throughout the length thereof and integral therewith. This form shown in Fig. 4 of the drawings, may be used in connection with flat objects such as covers 12 in much the same manner as above described.

It must be reiterated that it is not intended by the present invention that the automobile 14 shall itself be grounded since the utilization of the strips hereof, will not eliminate static electricity shock that is experienced when one approaches the automobile and grasps a door handle or comes into contact with other metallic parts thereof. Instead, the present invention proposes elimination of shock that results from passengers coming into contact with the seats of the automobile and particularly, the covers 12 thereof.

The material from which the covers 12 are made and the material of the clothing worn by the passengers are so unalike that a relatively high potential is created when such wearing apparel comes into frictional sliding engagement with the seat covers 12. The small difference in potential that results by use of the techniques herein described is of too low a magnitude to cause a perceptible shock to a passenger when he touches a metallic part of the automobile body because the charges on the passenger and on the seat cover 12 are discharged as they are produced, or immediately thereafter by the element hereof. This effect can only be accomplished when the grounding means is composed of a conductor that has the plurality of terminal ends as hereinabove described.

The provision of ordinary conductors mounted on the seat cover and disposed in engagement therewith, or even interwoven therein have not been successful for the very reason that the mediums used to produce the discharge do not cause rupture of the air dielectric, and resulting ionization, at a potential sufficiently low to be imperceptible to a passenger in the automobile, as in the present invention. Furthermore, elongated conductors, either in the form of a single wire, a flat metallic strip, or a plurality of fine wires grouped together and extending throughout the seat cover, do not discharge themselves quickly at a low potential, and for that reason, the discharge that takes place across the air gap between the passenger and the automobile body is of sufficient intensity to be perceptible and sometimes painful to the passenger.

Having thus described the invention what is claimed as new and desired to be secured by Letters Patent is:

1. In combination with a conductive automobile body having a nonconductive cover, an article interposed between said cushion and said cover for collecting and discharging static electricity charges on said cover, said article comprising an elongated, flexible tape having a longitudinally-extending conductive element mounted on one of its faces between the cover and the tape and including a mass of elongated, thin, metallic fibers engaging the cover, arranged in a haphazard, disorderly manner and disposed in relative overlapping interengagement, each fiber having a relatively small terminal end whereby, when the cover is charged, it will lose its charge by ionization and the element will discharge itself immediately; and means grounding said element to the automobile body.

2. In combination with a conductive automobile body having a nonconductive cover, an article interposed between said cushion and said cover for collecting and discharging static electricity charges on said cover, said article comprising an elongated, flexible tape having a longitudinally-extending element on one of its faces between the cover and the tape and including an elongated, flexible core mounted on said face of the tape and having mounted thereon a mass of elongated, thin, metallic fibers engaging the cover, arranged in a haphazard, disorderly manner and disposed in relative overlapping interengagement, each fiber having a relatively small terminal end whereby, when the cover is charged, it will lose its charge by ionization and the element will discharge itself immediately; and means grounding said fibers to the automobile body.

3. In combination with a conductive automobile body having a nonconductive cover, an article interposed between said cushion and said cover for collecting and discharging static electricity charges on said cover, said article comprising an elongated, flexible tape having a longitudinally-extending element on one of its faces between the cover and the tape and including an elongated, flexible core on said face of the tape and having mounted thereon a mass of elongated, thin, metallic fibers engaging the cover, arranged in a haphazard, disorderly manner and disposed in relative overlapping interengagement, each fiber having a relatively small terminal end whereby, when the cover is charged, it will lose its charge by ionization and the element will discharge itself immediately; means attaching the fibers to said face of the tape; and means grounding said fibers to the automobile body.

4. In combination with a conductive automobile body having a nonconductive cover, an article interposed between said cushion and said cover for collecting and discharging static electricity charges on said cover, said article comprising an elongated, flexible tape having a longitudinally-extending conductive element mounted on one of its faces between the cover and the tape and including a mass of elongated, thin, metallic fibers engaging the cover, arranged in a haphazard, disorderly manner and disposed in relative overlapping interengagement, each fiber having a relatively small terminal end whereby, when the cover is charged, it will lose its charge by ionization and the element will discharge itself immediately; means attaching said article to the cover; and means grounding said element to the automobile body.

References Cited in the file of this patent

UNITED STATES PATENTS

| | | |
|---|---|---|
| Re. 2,601 | Brittan | May 14, 1867 |
| 2,284 | Orcutt | Oct. 9, 1841 |
| 11,261 | Lyon | July 11, 1854 |
| 79,618 | Wells | July 7, 1868 |
| 1,744,004 | Hunt | Jan. 14, 1930 |
| 1,900,543 | Cochrane | Mar. 7, 1933 |
| 2,184,811 | Freer | Dec. 26, 1939 |
| 2,234,205 | Steele | Mar. 11, 1941 |
| 2,244,635 | Williamson | June 3, 1941 |
| 2,302,003 | Cadwell | Nov. 17, 1942 |
| 2,449,972 | Beach | Sept. 28, 1948 |